United States Patent Office 3,151,810
Patented Oct. 6, 1964

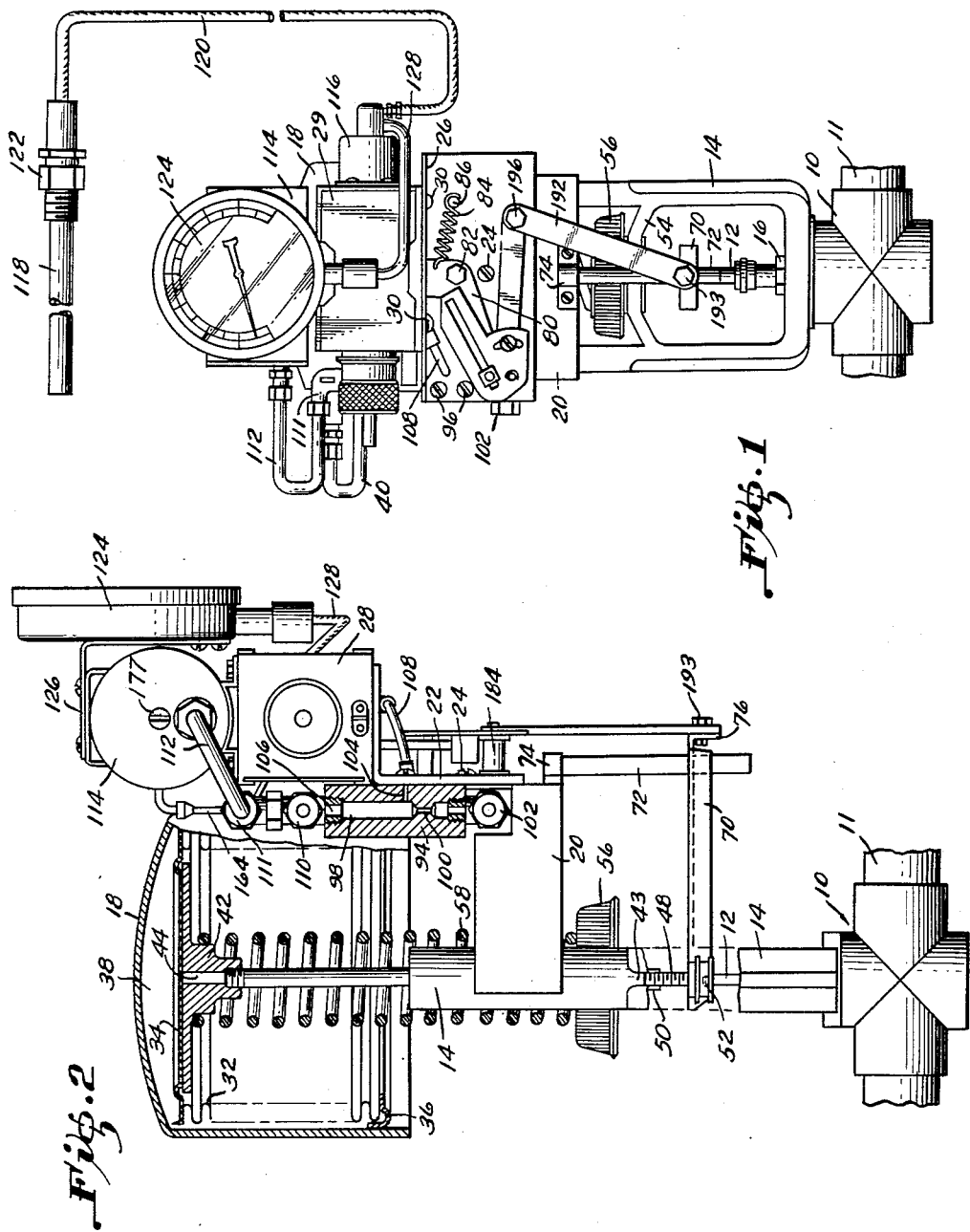

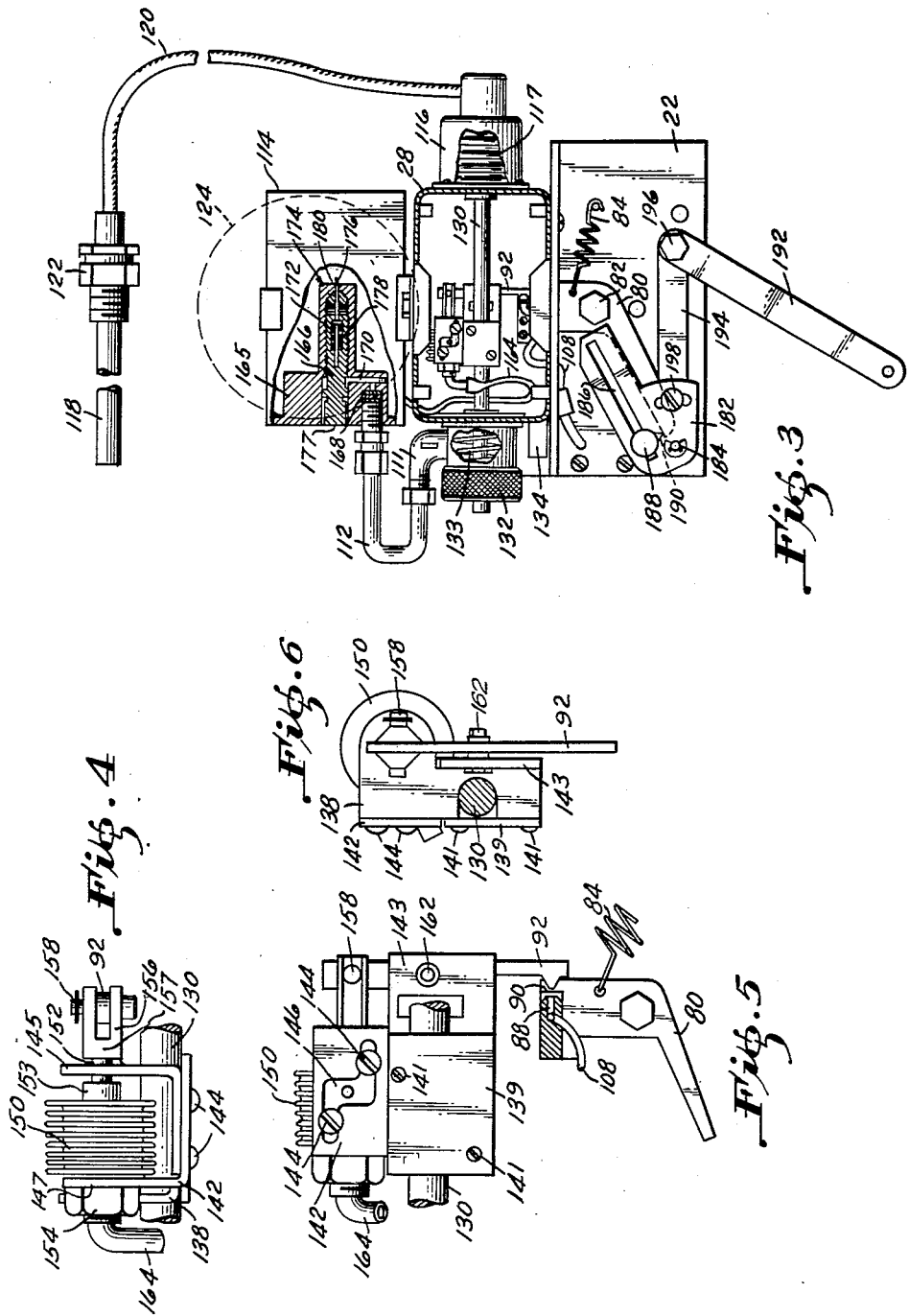

3,151,810
AUTOMATIC VALVE POSITIONER
Louis M. Puster, Knoxville, Tenn., assignor to Robertshaw Controls Company, Richmond, Va., a corporation of Delaware
Filed Feb. 2, 1961, Ser. No. 86,810
4 Claims. (Cl. 236—86)

This invention relates to a regulating control device for controlling and positioning a movable control means and more particularly to a control device that correctly positions and stabilizes a movable control member irrespective of the magnitude of the deviation of a measured variable from a predetermined set point.

It is an object of this invention to reduce the cycling movement of a movable control member of a control device which is responsive to the deviation of a measured variable.

Another object of this invention is to allow a substantially greater proportional movement of the movable control member of a control device without a large deviation from the desired control point.

Still another object of this invention is to combine a pneumatically operated control device, adjustable to a desired control point, with an adjustable pneumatic reset mechanism to provide the movable control member with a maximum stability and a minimum of deviation from the desired control point.

In accordance with this invention, a primary measuring element which is a condition responsive device, such as a pressure measuring element or a temperature measuring element, actuates a controller which comprises a baffle actuator causing a baffle to move relative to an air nozzle to regulate air pressure within a pressure operated actuating means. The actuating means in turn controls the position of the final control element. A feedback linkage connected to the actuating means and the nozzle tends to reposition the nozzle relative to the baffle and stabilize the system. Simultaneously, the nozzle pressure is recorded by a capacitance tank and a reset bellows, which bellows is mounted on the baffle actuator and is operatively connected to the baffle for additional movement thereof relative to the nozzle. Therefore, the baffle is accurately positioned relative to the nozzle in accordance with the desired control point.

Other objects and advantages of this invention will be apparent from the following description taken in conjunction with the accompanying drawings in which:

FIG. 1 is a front elevational view of the control device;

FIG. 2 is an enlarged side elevational view of the device shown in FIG. 1 with parts in section and portions broken away;

FIG. 3 is an enlarged front elevational view of the reset mechanism of the device shown in FIG. 1 with parts in section and portions broken away;

FIG. 4 is an enlarged top view of the reset bellows mechanism;

FIG. 5 is an enlarged front elevational view showing the reset bellows mechanism attached to the input stem of the device;

FIG. 6 is a side elevational view of the device shown in FIG. 5; and

Figure 7:
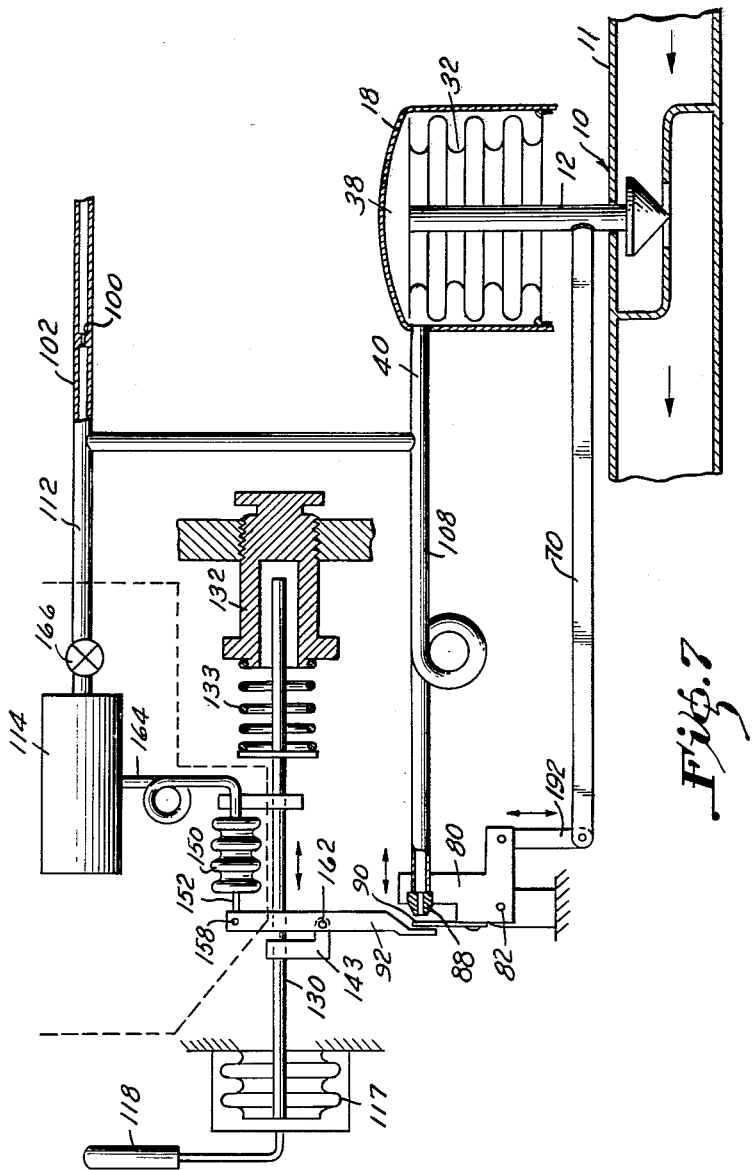
FIG. 7 is a schematic view of the system of the control device.

Referring now to the drawings and more particularly to FIGS. 1 and 2, a control device is shown wherein a valve 10 is connected to a flow conduit 11 through which a control agent passes. Valve 10 can be of any well known type in which the flow of the control agent through the flow conduit 11 is controlled in response to movement of a valve stem 12 which extends exteriorly of the casing of valve 10.

Valve stem 12 slidably extends through a generally U-shaped frame 14 mounted upon valve 10 by connecting means 16. Integrally formed with the upwardly extending legs of U-shaped frame 14 is a ring-shaped member adapted to mount the cup-shaped cup 18.

A U-shaped bracket 20 is welded or otherwise secured to the legs of frame 14 at the outer ends of its arms. An L-shaped support plate 22 is secured to the bight portion of bracket 20 by means of screws 24 so that its base plate 26 extends substantially horizontally outwardly from the legs of frame 14. A generally rectangular enclosure or housing 28 is connected to base plate 26 by a plurality of nut and bolt assemblies 30. It is preferable that the outer side of housing 28 be formed with a removable plate 29 which can be inscribed with suitable information pertaining to the operation of this device.

As best shown in FIG. 2, pressure operated actuating means for moving valve stem 12 includes an expansible and contractible corrugated tubular wall or bellows 32 disposed interiorly within cap 18 and hermetically sealed at its opposite ends to a movable end wall 34 and a stationary annular member 36 secured and hermetically sealed to the inner wall of cap 18 adjacent its open end. Cap 18, bellows 32, end wall 34, and annular member 36 define a chamber 38 which is connected to a source of pressurized fluid by means of conduit 40.

Movable end wall 34 transmits motion to valve stem 12 by means of a flanged driven member 42 which abuts against the surface of end wall 34. The remote end of rod 43 is formed with an exteriorly threaded end which cooperates with a centrally disposed interiorly threaded aperture 44 in driven member 42. The opposite end of rod 43 is interiorly threaded to receive the threaded shank of a bolt 48. A lock nut and washer assembly 50 secure bolt 48 in place. A pin 52 secures the stem 12 to the head of bolt 48.

A support plate 54 is formed between the legs of frame 14. An adjusting nut 56 is threadedly mounted to a stationary sleeve member (not shown) which is secured to support plate 54 and encompasses the lower portion of rod 43. A helical compression spring 58, having flat faced ends, abuts the undersurface of the flange of driven member 42 and the upper surface of adjusting nut 56. Rotation of adjusting nut 56 will vary the biasing force of spring 58 to adjust the force acting on movable end wall 34. In this manner, the pneumatic force exerted within chamber 38 can be varied and is adjustable to the pneumatic supply of different pressures supplied by conduit 40.

A plate member 70 is securely attached to the head of bolt 48 so as to extend substantially at a right angle thereto. A guide rod 72 is secured to the bight portion of the U-shaped bracket 20 by means of a clamp and screw assembly 74 and extends downwardly so as to be accommodated in a guide aperture formed in plate member 70. Guide rod 72 guides the vertical movement of plate member 70 and restricts all horizontal movement of plate member 70. The outer end of plate member 70 is formed to have an end wall 76 through which an aperture extends.

A first lever, in the form of a bell crank 80, is pivotally mounted on a bolt 82 connected to support plate 22. A helical tension spring 84 is connected at opposite ends to a stationary rod 86 which extends perpendicularly from plate 22 and bell crank 80 so as to bias the bell crank in a clockwise direction about bolt 82 as viewed in FIG. 1. As shown in FIG. 5, a nozzle 88 and a flapper 90 are mounted on bell crank lever 80. A pivoted flapper actuator 92 is positioned adjacent flapper 90.

An air inlet block 94 is secured to the opposite side of plate 22 by means of screws 96, which screws are threaded into block 94. Block 94 is formed with a passage 98 which extends between opposite surfaces and has a restrictor 100 intermediate its length. The upstream end of passage 98 is adapted to be connected to a pressurized source of air by means of an elbow inlet 102. Downstream from restrictor 100, passage 98 is formed with a pair of outlets 104 and 106, respectively. Outlet 104 is connected through flexible tubing 108, which passes through an aperture in plate 22 and a grommet positioned in the base plate 26, to nozzle 88. The outlet 106 is connected to a T-fitting 110 so that the horizontal leg of the fitting is adapted to be connected to conduit 40 communicating with chamber 88. The vertical leg of T-fitting 110 is connected to elbow outlet 111 which in turn is connected to conduit 112 so as to communicate the inlet pressure with the reset capacitance tank 114.

A cap member 116, which encloses a pressure sensitive bellows 117, is secured to the end wall of housing 28. Bellows 117 is in communication with the interior of a tubular temperature responsive device 118 by means of tube 120. Fittings 122 are positioned on the temperature responsive device so as to properly mount the temperature responsive device 118 in an appropriate manner to define a primary sensing element. Temperature responsive device 118, tube 120, and bellows 117, enclosed within enclosure 116, are filled with an appropriate temperature sensing medium of the vapor pressure type which changes pressure in response to changes in temperature. A pressure sensitive gauge 124 is secured to housing 28 by a bracket assembly 126. A suitable conduit 128 communicates the mechanism of gauge 124 with temperature responsive device 118.

As best shown in FIG. 3, a rod 130 is secured at one end to bellows 117 enclosed in enclosure 116 and extends the length of housing 28. Rod 130 passes through a suitable aperture in the opposite end wall of housing 28. A control knob 132, rotatably mounted on an exteriorly threaded tubular member connected to the end wall of housing 28, encloses a helical compression spring 133 which cooperates with rod 130 to exert a biasing force thereon. Control knob 132 cooperates with suitable indicia 134 positioned adjacent to the knob for determining the relative settings of the control knob.

The force created within bellows 117 will act on the end of rod 130 in direct proportion to the temperature recorded in temperature responsive device 118. The force sensed therein will be opposed by the helical spring 133 contained within control knob 132. By rotating knob 132, the compression of the enclosed spring 133 is changed, causing the force balance exerted on diametrically opposed portions of rod 130 to occur at a slightly different value, tending to displace rod 130 longitudinally. Therefore, knob 132 provides, in effect, adjustable means for varying the set point of rod 130 of the control device.

As shown more particularly in FIGS. 4–6, a generally U-shaped connector bracket 138, having an enlongated cutout subtending a portion of the bight portion of the bracket and having a suitable configuration on the legs of the bracket to accept rod 130, is secured to rod 130 by means of cooperating plate 139. Plate 139 is connected to bracket 138 by means of screws 141 in a manner such as to hold brackets 138 in a positive rigid position relative to rod 130. A portion 143 of bracket 138 is formed to extend outwardly from and substantially at a right angle to one leg 145 of bracket 138. A suitable aperture is formed in the outwardly projecting portion 143 of bracket 138, which aperture will support a bearing pin 162 to be described hereinafter. One leg 145 and the bight portion of bracket 138 are extended upwardly to form an L-shaped portion, which portion has two threaded apertures located in the upwardly extending bight portion. An L-shaped bracket 142 is secured to the upwardly projecting portion of bracket 138 by screws 144 threadedly positioned within the threaded apertures of the bracket 138. As is more particularly shown in FIGS. 4 and 5, leg 145 of bracket 138 can be positioned a determinable distance from an opposed leg 147 of the L-shaped bracket 142 by means of slide 146 and cooperating screws 144.

A reset bellows 150, defining a secondary sensing element, is positioned intermediate the oppositely disposed legs 145 and 147 of the cooperating brackets 138 and 142, respectively, in such a manner that an operating stem 152 of bellows 150 slidably extends through an aperture in arm 145 of bracket 138. A stop member 153 secured to end wall of bellows 150 cooperates with bracket 145 to prevent movement of operating stem 152 at pressures in excess of the pressure required in chamber 38 to close valve 10. This is accomplished by adjusting the position of bracket 142 by means of slide 146. The bifurcated arm member 156 having a bight portion 157 is securely attached to the outer portion of stem 152. Stem 152 is exteriorly threaded at its opposite end, which thread engages the centrally interior thread in stop member 153. Bifurcated arm member 156 can, therefore, be adjusted by varying the engagement of these threads so that bight portion 157 cooperates with bracket 145 such as to prevent movement of operating stem 152 at pressures below that required for the valve 10 to be wide open. Thus, stop 153 and bight portion 157 limit the reset movement so that operating stem 152 reaches a stop position, in either direction, before it would reach an extreme position which would require an excessive temperature change as sensed by the temperature responsive means 118 before valve 10 could be moved from an extreme position. The opposite end of bellows 150 abuts against and fits flat with the flat wall of L-shaped bracket 142. A cooperating threaded stud and lock nut assembly 154, positioned on the outer surface of bracket 142, securely positions bellows 150 between the two legs of the cooperating brackets.

A bifurcated arm member 156 is secured to the outer portion of operating stem 152, with each arm thereof having bearing apertures centrally positioned therein. A bearing pin 158 passes through the apertures and in addition cooperates with an aperture located on the remote end of flapper actuator 92 so as to rotatably mount flapper actuator 92. Intermediate the ends of actuator 92, a second bearing pin 162 cooperates with the outwardly extending portion 143 of connector bracket 138 to pivotally mount actuator arm 92. In this manner, the reset bellows assembly is adapted to travel longitudinally with rod 130 and in addition a variable pressure in reset bellows 150 is reflected in pivotal movement of actuator arm 92 relative to flapper and nozzle 88 on bell crank lever 80.

As shown in FIG. 3, the reset bellows 150 is in communication with the capacitance tank 114 by means of flexible tubing 164. A plug member 165 forms the end wall of cup-shaped capacitance tank 114.

Centrally disposed within the plug member 165 at one end of capacitance tank 114, there is positioned a needle valve assembly 166. A threaded inlet port 168 cooperates with conduit 112 to form an air-tight connection. Passageway 170 communicates the inlet pressure with elongated needle valve adjustment stem 172 threaded into an elongated interiorly threaded projection 174 formed in plug member 165. One side of the needle valve adjustment stem 172 has a flat surface so as to form a passageway to the tapered pointed section 176 of the needle valve assembly 166. A resilient spring 178 is annularly disposed about the cylindrical end opposite to the pointed section 176 of the needle valve and acts as an overrun spring to prevent damage to the long tapered needle valve in the event needle valve adjustment stem 172 is threadedly engaged an excessive amount. A slot 177 in the outer end of needle valve assembly 166 rotates valve adjustment stem 172 on the interior threaded portion of projection 174 to longitudinally position assembly 166 within projection 174. The needle valve described herein provides an adjustable variable restriction for fluid flow to the capacitance tank 114.

As shown in FIG. 3, a second lever 182 is pivotally mounted on a pivot 184 which is connected to plate 22 by suitable means, such as, for example, by threading one end of pivot 184 into an aperture in plate 22. A slide 186 is formed in lever 182 and a cooperating thumbscrew 188 positioned therein. Thumbscrew 188 has a pointed projection 190 adapted to suitably engage the upper edge of bell crank lever 80.

A link arm 192, secured to plate member 70 by nut and bolt assembly 193, is adapted for movement in response to movement of valve stem 12. A second lever arm 194 is pivotally secured to link arm 192 by bearing 196. A screw and slot assembly 198 positions lever arm 194 relative to lever 182.

It will be readily apparent, therefore, that any vertical movement of valve stem 12 will be reflected in vertical movement of one end of link 192, whereby lever 182 is rotated in a clockwise or counterclockwise direction about pivot 184. As pointed projection 190 engages the upper surface of bell crank lever 80, and as tension spring 84 biases bell crank lever 80 into engagement with pointed projection 190, clockwise or counterclockwise movement is transmitted to bell crank lever 80. Accordingly, bell crank lever 80 will rotate about bolt 82 and, as best shown in FIG. 3, nozzle 88 and flapper 90 will be positioned relative to actuator arm 92.

In FIG. 7, the elements of the control device are diagrammatically illustrated wherein the same reference numerals used above have been given to the operative elements shown therein.

In operation, a rise in temperature sensed by the bulb 118 produces an input signal in bellows 117 tending to displace rod 130 against the bias of spring 133. As previously described, knob 132 is adjustable to vary the biasing force of spring 133. Movement of rod 130 moves portion 143 of connector bracket 138 so that the flapper actuator 92 moves the baffle 90 tending to close nozzle 88.

As the diameter of nozzle 88 is somewhat larger than the diameter of restrictor 100, the pressure of the fluid being discharged from nozzle 88 will be at substantially atmospheric pressure when the flapper 90 is displaced a relatively short distance from nozzle 88. As flapper 90 moves towards nozzle 88, the flow of air is restricted with the resultant increase in back pressure which causes the pressure in chamber 38 to increase.

Upon an increase in air pressure in chamber 38, bellows 32 tends to contract to thereby close valve 10. The valve's travel, as represented by displacement of the valve stem 12, is reflected in the feedback linkage link 192 which thereby pivots bell crank lever 80 about bolt 82. The nozzle 88, accordingly, is displaced away from baffle 90 so that the air leakage increases with closing movement of the valve 10 and thus reduces the actuating pressure in the chamber 38 as the control system approaches stabilization at the desired set temperature.

The closure of the nozzle 88 by the flapper 92 in response to a temperature increase sensed by bulb 118, effects an increase in air pressure in chamber 38 and, simultaneously, effects an increase in air pressure in conduit 112 so that the needle valve assembly 166 bleeds air slowly to allow an increased pressure to occur in reset capacitance tank 114. The increase in pressure in reset capacitance tank 114 is reflected in tubing 164 and reset bellows 150. Operating stem 152 of reset bellows 150 is displaced to the left tending to cause counterclockwise movement of flapper actuator 92 about bearing pin 162. As flapper actuator 92 gradually moves the baffle into engagement with nozzle 88, the pressure in chamber 38 is increased, tending to move valve 10 toward the closed position.

The feedback action of the capacitance tank 114 and bellows 150 tends to reduce the flow of heating medium through valve 10 to thereby cause a second gradual reduction in the opening of the valve. This second gradual decrease in the flow of the heating medium causes a gradual temperature drop so that when the temperature recorded at the bulb 118 is identical to the temperature set by knob 132, there will be no variable temperature recorded within the heated chamber so as to continually fluctuate the position of valve 10. Therefore, incorporating the reset capacitance tank 114 and the reset bellows assembly 150 in the above operation, there is a positive repositioning of the valve 10 to eliminate overshoot and excessive fluctuation of the temperature within the heated chamber.

Further, adjustment of needle valve assembly 166 will determine the speed at which the bellows 150 is responsive to the air supply pressure to thereby obtain a fast acting positive control device.

In addition, it is to be understood that the control device could be used to operate a mechanism such as the damper for a heating system, or serve to provide an input signal for another controller. The control device described above is not to be limited to a thermal sensing element but may be used with elements sensing changes in pressure, pressure differential, and the like.

This invention is readily adaptable to be connected to various valves which have different valve lifts between fully open and fully closed positions. By changing the position of thumbscrew 188 in slide 186, the proportionality factor of the nozzle and flapper relative to the valve lift will be correspondingly changed.

It will be apparent to those skilled in the art that many changes may be made in the arrangement of parts without departing from the scope of the invention as defined in the appended claims.

I claim:

1. In control apparatus for regulating a fluid flow in accordance with a condition affected by the flow, the combination comprising valve means movable to regulate the fluid flow, pressure responsive means operatively associated with said valve means, a supply of pneumatic pressure, passage means having flow restriction means therein, said passage means having inlet means upstream of said restriction means communicating with said pressure supply and having outlet means downstream of said restriction means communicating with said pressure responsive means for moving said valve means, lever means having a pivotal mounting, a bleed nozzle of larger diameter than said restriction means and being fixed to said lever means and communicating with said outlet means and said pressure responsive means, a flapper movably disposed adjacent said bleed nozzle to vary the bleed therefrom and affect the movement of said valve means, a primary sensing element adapted to be responsive to the condition affected by the flow, a motion transmitting member having one end connected to said primary sensing element for movement thereby in response to changes of the condition effected by the flow, biasing means exerting a biasing force on another end of said motion transmitting member, adjustment means for said biasing means to adjust the biasing force on said motion transmitting member, a flapper actuator operatively connected to said motion transmitting member for movement thereby whereby said flapper actuator moves said flapper relative to said bleed nozzle in response to changes sensed by said primary sensing element, a feedback linkage interconnected between said valve means and said lever means for repositioning said bleed nozzle upon movement of said valve means whereby presure in said pressure responsive means is varied to position said valve means in proportion to a change of the condition affected by the flow, pivot means for said flapper actuator for pivoting the same independently of said motion transmitting member, a secondary sensing element operatively connected to said flapper actuator for pivoting the same and imparting a reset movement thereto relative to said bleed nozzle, a reset capacitance tank having an outlet communicating with said secondary sensing element, said capacitance tank having an inlet communicating said outlet means and said bleed nozzle so that pneumatic pressure variations at said bleed nozzle causes a corresponding pneumatic pressure varition in said reset capacitance tank as reflected by a rate of input thereto whereby said flapper actuator is moved by said secondary sensing element in accordance with pressure variations in said reset capacitance tank to effect a gradual variation of pressure in pdisaesrseri ETAO ETAO ETAOIETA of pressure in said pressure responsive means for positioning said valve means.

2. The combination as recited in claim 1 wherein the inlet of said reset capacitance tank is provided with adjusting means to vary the rate of input to said reset capacitance tank.

3. The combination as recited in claim 2 wherein bracket means is attached to said motion transmitting member and includes a connection for said pivot means and said secondary sensing element is supported on said bracket means for movement with said motion transmitting member.

4. The combination as recited in claim 3 wherein said bracket means includes a pair of spaced leg members with said secondary sensing element therebetween, said secondary sensing element having one end fixed to one of said leg members and an opposite end movable relative to the other leg member, and stop means on said other leg member to limit reset movement of said secondary sensing element relative to said bracket means.

References Cited in the file of this patent

UNITED STATES PATENTS

| | | |
|---|---|---|
| 1,985,829 | Hubbard | Dec. 25, 1934 |
| 2,035,966 | Hubbard | Mar. 31, 1936 |
| 2,061,118 | Vogt | Nov. 17, 1936 |
| 2,062,437 | Abbott | Dec. 1, 1936 |
| 2,278,016 | Otto | Mar. 31, 1942 |
| 2,388,457 | Ziegler | Nov. 6, 1945 |
| 2,536,198 | Matner et al. | Jan. 2, 1951 |

FOREIGN PATENTS

| | | |
|---|---|---|
| 254,469 | Great Britain | July 8, 1926 |

UNITED STATES PATENT OFFICE
CERTIFICATE OF CORRECTION

Patent No. 3,151,810                              October 6, 1964

Louis M. Puster

It is hereby certified that error appears in the above numbered patent requiring correction and that the said Letters Patent should read as corrected below.

Column 7, line 8, strike out "of pressure in pdisaesrseri ETAO ETAO ETAOIETA --.

Signed and sealed this 19th day of January 1965.

(SEAL)
Attest:

ERNEST W. SWIDER                          EDWARD J. BRENNER
Attesting Officer                            Commissioner of Patents